US012802712B2

(12) United States Patent
Beard et al.

(10) Patent No.: US 12,802,712 B2
(45) Date of Patent: Nov. 17, 2026

(54) CROSS-LANGUAGE VOICE SIMILARITY ANALYSIS

(71) Applicant: Disney Enterprises, Inc., Burbank, CA (US)

(72) Inventors: Audrey Coyote Aura Beard, Albany, NY (US); Ugaso Sheikh-Abdi, Berkeley, CA (US); Michael Reed, Brooklyn, NY (US); Richmond Felton, Burbank, CA (US); Morgan Justice, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 157 days.

(21) Appl. No.: 18/817,977

(22) Filed: Aug. 28, 2024

(65) Prior Publication Data

US 2025/0372116 A1 Dec. 4, 2025

Related U.S. Application Data

(60) Provisional application No. 63/652,872, filed on May 29, 2024.

(51) Int. Cl.
*G10L 25/51* (2013.01)
*G10L 15/22* (2006.01)
*G10L 17/22* (2013.01)

(52) U.S. Cl.
CPC .............. *G10L 25/51* (2013.01); *G10L 15/22* (2013.01); *G10L 17/22* (2013.01)

(58) Field of Classification Search
CPC ......... G10L 25/51; G10L 15/22; G10L 17/22; G10L 17/26; G10L 25/30; G10L 13/033; G10L 3/00; G10L 13/02; G10L 13/027; G10L 13/08; G10L 13/10; G10L 15/26; G10L 25/63; G10L 25/93
See application file for complete search history.

(56) References Cited

U.S. PATENT DOCUMENTS 12,101,516 B1 * 9/2024 Theckyam .............. G06F 40/58
2020/0364303 A1 * 11/2020 Liu ......................... G06F 40/30
2024/0087597 A1 * 3/2024 Byun .................... G10L 13/033

* cited by examiner

*Primary Examiner* — Carolyn R Edwards
*Assistant Examiner* — Julie X Dang
(74) *Attorney, Agent, or Firm* — Farjami & Farjami LLP

(57) ABSTRACT

A system includes a hardware processor and a memory storing a cross-language voice similarity analyzer (analyzer). The hardware processor executes the analyzer to generate an embedding vector representation of an audio sample of a human voice in a feature space including existing embedding vectors corresponding respectively to different reference voices, decompose the embedding vector representation to identify a linear or non-linear combination of vocal component vectors corresponding to the human voice, each vocal component vector representing a respective predetermined voice characteristic descriptor, increase the dimensionality of the linear or non-linear combination of the vocal component vectors to match the dimensionality of the embedding vector representation to provide a reconstructed embedding vector representation of the human voice, and identify, by comparing the reconstructed embedding vector representation with one or more of the existing embedding vectors, one of the reference voices as a match for the audio sample of the human voice.

20 Claims, 6 Drawing Sheets

Fig. 3

336

370 372

| Voice Characteristic Descriptor | Semantic Description |
|---|---|
| Nasally | Much of the sound seems to come through the nose. |
| Stuffy/Adenoidal | No sound coming through the nose |
| Airy/Breathy | Pushes air when speaking, usually quieter type. |
| Constricted | |
| Dead, Flat, Monotonous | Spoken in a voice that does not go up and down; expressionless |
| Grating | Unpleasant and annoying. |
| Gravelly | Low and rough. |
| Gruff | Has a rough, textured low sound. |
| Guttural | Deep and made at the back of your throat. |
| High-Pitched | Very high and shrill. |
| Hoarse/Husky | Low rough voice, usually because their throat is sore. |
| Honeyed/Saccharine | Falsely sweet voice. |
| Husky | A husky voice is deep and sounds hoarse often in an attractive way. |
| Low/Deep | |
| Penetrating/Shrill | So high or loud that it makes you uncomfortable; very loud, high, and unpleasant. |
| Raucous | Loud and sounds rough. |
| Singsongy | Rises and falls in a musical way. |
| Small | A small voice or sound is quiet. |
| Smoky | Sexually attractive in a slightly mysterious way. |
| Smooth/Velvety | |
| Softly Spoken | A quiet gentle voice. |
| Strident | Loud and unpleasant. |
| Textured | |
| Thick | Full, weighted, heavy voice; pure |
| Thin | High, without weight or support |
| Wheezy | Has difficulty breathing. |
| Wobbly | Unstable tone due to fright or emotions. |

CROSS-LANGUAGE VOICE SIMILARITY ANALYSIS

RELATED APPLICATIONS

The present application claims the benefit of and priority to a U.S. Provisional Patent Application Ser. No. 63/652,872 filed on May 29, 2024, and titled "Cross-Language Voice Similarity Analysis," which is hereby incorporated fully by reference into the present application.

BACKGROUND

Major film and television (TV) studios typically produce large amounts of audiovisual (AV) content (e.g., feature films, episodic TV content, and the like) in a single language for their primary home market. To maximize the value of this content and compete internationally, these studios often undertake a meticulous localization process, whereby a given piece of AV content is modified to be more relevant and comprehensible to consumers in a target foreign market.

One of the most common forms of localization is dubbing, in which all of the source language dialog and vocal musical performances are replaced with appropriate dialog and vocals in the target foreign language. The voice talent cast for these localized versions are often chosen because their voice or affectation matches closely with that of the original version. Historically, this voice casting process has been largely manual, iterative, expensive, and biased towards previously cast talent.

Voice casting for regionally localized content, using conventional methods, is a highly manual process that requires personnel within international casting departments to search through many auditions to find similar sounding voices. This is a process that has traditionally been managed by a few human experts who hold years of embodied knowledge, resulting in the risk of bias based on established relationships with or preferences for certain talent but not others, and brittleness based on the chance of losing experienced voice casting personnel to other studios. Consequently, there is a need in the art for automating or partially automating the voice casting process to increase the speed and efficiency with which such casting can be performed, while reducing its vulnerability to the vagaries of human bias and inconstancy.

BRIEF DESCRIPTION OF THE DRAWINGS

FIG. 3 shows a table including an exemplary list of predetermined human readable voice characteristic descriptors each corresponding respectively to a vocal component vector suitable for use in performing cross-language voice similarity analysis, as well as a semantic description of each voice characteristic descriptor, according to one implementation;

DETAILED DESCRIPTION

Figure 1:
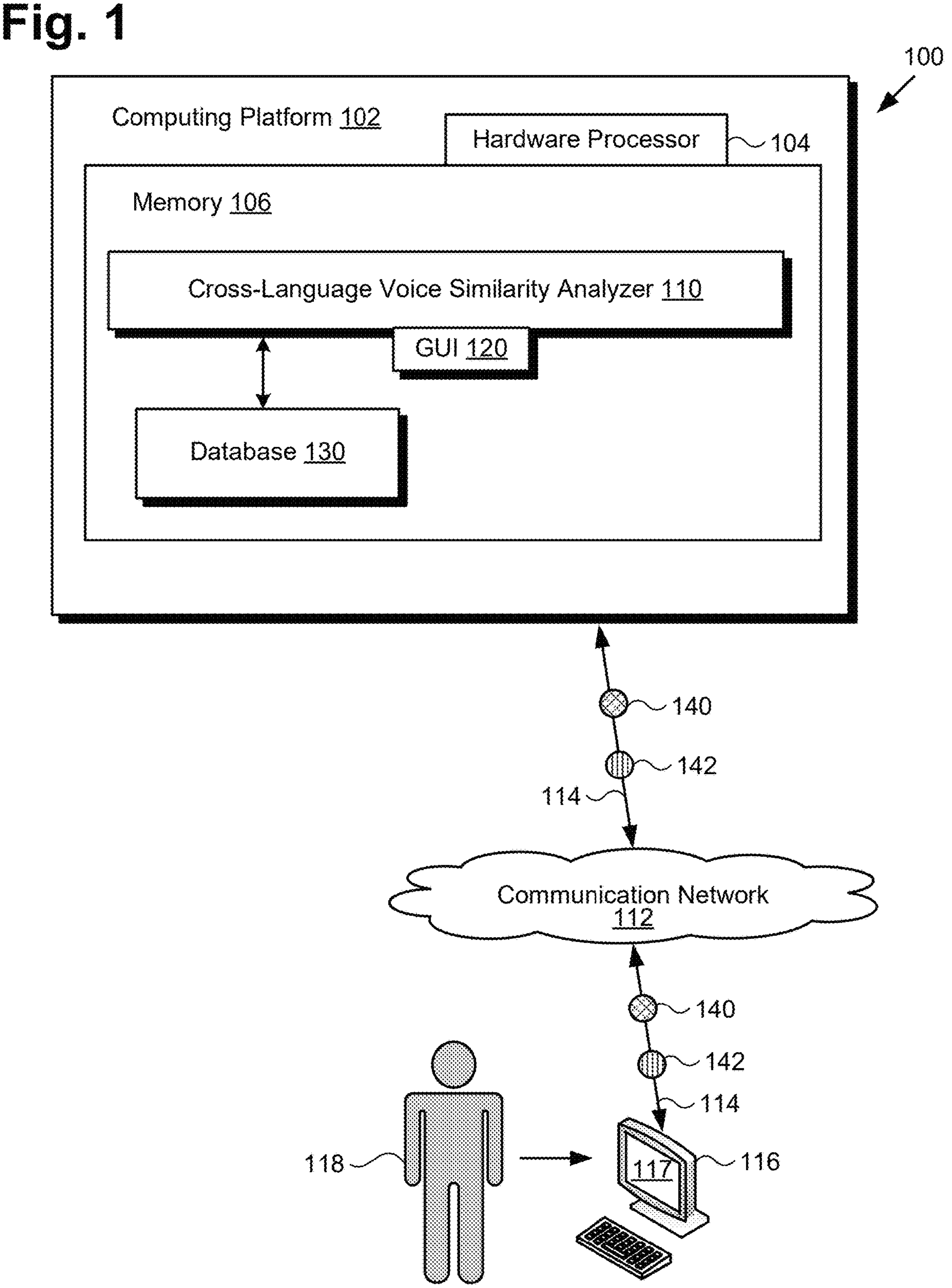
FIG. 1 shows a diagram depicting an exemplary system for performing cross-language voice similarity analysis, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, voice casting for regionally localized content, using conventional methods, is a highly manual process that requires personnel within international casting departments to search through many auditions to find similar sounding voices. As further stated above, this is a process that has traditionally been managed by a few human experts who hold years of embodied knowledge, resulting in the risk of bias based on established relationships with or preferences for certain talent but not others, and brittleness based on the chance of losing experienced voice casting personnel to other studios.

The present application addresses and overcomes this deficiency in the conventional art by disclosing a cross-language voice similarity analysis solution designed to streamline the process of voice casting by efficiently computing voice similarity to find well-matched voices across different spoken languages while preserving interpretability and creative control for voice casting personnel, making the work of voice casting both faster and more thorough. It is noted that, beyond the technical challenge of computing voice similarity, voice casting is considerably more complex because the cross-language voice similarity analysis process must operate reliably across different languages, dialects, and accents within spoken content. In addition, the emotive distribution of professional actors portraying dramatized characters can diverge widely from most open-source datasets for voice similarity. Moreover, many voiced roles include sung vocal performances, which typically diverge even further from the unaffected spoken utterances of most commonly available datasets.

By way of overview, the cross-language voice similarity analysis solution disclosed in the present application uses a pre-trained speaker recognition embedding model, along with a collection of exemplary voice samples typifying distinct voice components to accomplish three primary tasks: (i) surface and rank similar sounding voices, (ii) characterize dialog and musical vocal performances with human readable descriptors, and (iii) allow users to refine results by specifying desirable voice characteristics and their relative prominence.

These aforementioned functions save valuable time while enabling voice casting personnel to retain creative control in order to produce source-accurate localized content more efficiently. One key to preserving creative control for voice casting personnel lies in the use of the exemplary voice samples alluded to above, hereinafter referred to as "exemplars." These exemplars consist of voice characteristic descriptors (e.g., "shrill," "gravelly," "nasally," etc.) and a set of characters for each descriptor (as played by various actors) who exemplify these voice characteristics. Voice samples from each character, hereinafter referred to as "reference voices," are projected as vectors into an embedding space and labeled with one or more appropriate voice characteristic descriptors. After projecting each reference voice into the embedding space, the vectors are aggregated for each voice characteristic descriptor to form the mean vector representing a canonical expression of that voice characteristic descriptor, each of which is referred to herein as a "vocal component vector." These vocal component vectors form a pseudo-basis for the subspace of reference voices (with no guarantee that the vocal component vectors form a true mathematical basis).

With a pseudo-basis, query audio samples of human voices can be decomposed into each of these voice component vectors. By surfacing the weights for each voice characteristic descriptor for query and reference voices, and enabling voice casting personnel to adjust desired weights for each, the cross-language voice similarity analyzer disclosed herein advantageously allows voice casting personnel to refine their results by increasing or decreasing weights on certain voice components. This refinement process is an important component for casting departments, where it is typically preferable that creative control remain in the hands of human experts. It is noted that although it is contemplated that the cross-language voice similarity analyzer described in the present application will provide a powerful interactive tool for voice casting personnel, in some use cases the cross-language voice similarity analysis solution disclosed herein may advantageously be implemented as automated or substantially automated systems and methods.

As used in the present application, the terms "automation," "automated" and "automating" refer to systems and processes that do not require the participation of a human user, such as a member of a voice casting team. Although, as noted above, in some implementations the performance of the systems and methods disclosed herein may be monitored or refined by voice casting personnel, that human involvement is optional. Thus, the methods described in the present application may be performed under the control of hardware processing components of the disclosed systems.

FIG. 1 shows a diagram of system 100 for performing cross-language voice similarity analysis, according to one exemplary implementation. As shown in FIG. 1, system 100 includes computing platform 102 having hardware processor 104, and memory 106 implemented as a computer-readable non-transitory storage medium. According to the present exemplary implementation, memory 106 stores cross-language voice similarity analyzer 110 providing graphical user interface (GUI) 120, and database 130.

As further shown in FIG. 1, system 100 is implemented within a use environment including communication network 112 providing network communication links 114, user 118, who may be a casting team member for example, and user system 116 utilized by user 118 to interact with system 100 via communication network 112 and network communication links 114. Also shown in FIG. 1 are display 117 of user system 116, query audio sample 140 of a human voice received by system 100 from user system 116, and one or more reference voice matches 142 (hereinafter "reference voice match(es) 142") corresponding to query audio sample 140 and provided to user system 116 by system 100.

Memory 106 of system 100 may take the form of any computer-readable non-transitory storage medium. The expression "computer-readable non-transitory storage medium," as defined in the present application, refers to any medium, excluding a carrier wave or other transitory signal, that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, internal and external hard drives, optical discs, RAM, programmable read-only memory (PROM), erasable PROM (EPROM) and FLASH memory.

Moreover, in some implementations, system 100 may utilize a decentralized secure digital ledger in addition to memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

Although FIG. 1 depicts cross-language voice similarity analyzer 110 and database 130 as being co-located in a single instance of memory 106, that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and memory 106 may correspond to distributed processor and memory resources within system 100, while cross-language voice similarity analyzer 110 and database 130 may be stored remotely from one another on the distributed memory resources of system 100.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs from memory 106, while a GPU may be implemented to reduce the processing overhead of the CPU by performing computationally intensive graphics or other processing tasks. A TPU is an application-specific integrated circuit (ASIC) configured specifically for artificial intelligence applications such as machine-learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth, for instance to communicate with user system 116. Furthermore, in some implementations, system 100 may be implemented virtually, such as in a data center. For example, in some implementations, system 100 may be implemented in software, or as virtual machines. Moreover, in some implementations, system 100 may be configured to communicate via a high-speed network suitable for high performance computing (HPC). Thus, in some implementations, communication network 112 may be or include a 10 GigE network or an Infiniband network, for example.

Although user system 116 is depicted as a desktop computer in FIG. 1, that representation is merely exemplary. In various use cases, user system 116 may take the form of a tablet computer, laptop computer, smartphone, or an augmented reality (AR) or virtual reality (VR) device, for example, providing display 117. In other implementations, user system 116 may be a peripheral device of system 100 in the form of a "dumb" terminal. In those implementations, user system 116 may be controlled by hardware processor 104 of computing platform 102.

With respect to display 117 of user system 116, display 117 may take the form of a liquid crystal display (LCD), a light-emitting diode (LED) display, an organic light-emitting diode (OLED) display, a quantum dot (QD) display, or any other suitable display screen that performs a physical transformation of signals to light. Furthermore, display 117 may be physically integrated with user system 116 or may be communicatively coupled to but physically separate from user system 116. For example, where user system 116 is implemented as a smartphone, laptop computer, tablet computer, or an AR or VR device, display 117 will typically be integrated with user system 116. By contrast, where user system 116 is implemented as a desktop computer, display 117 may take the form of a monitor separate from user system 116 in the form of a computer tower.

Figure 2:
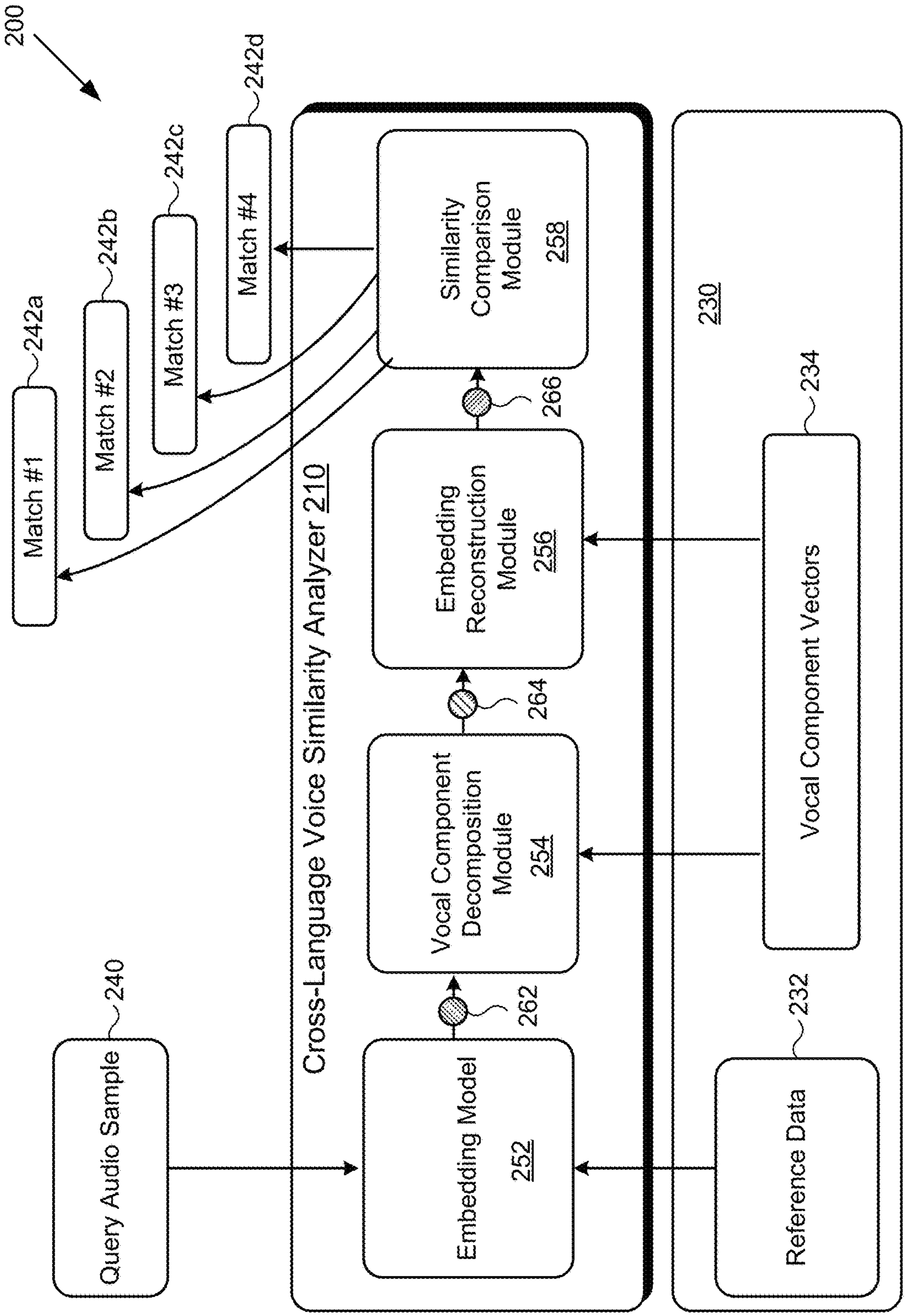
FIG. 2 shows a diagram providing a more detailed depiction of an exemplary cross-language voice similarity analyzer, according to one implementation.

FIG. 2 shows diagram 200 providing a more detailed depiction of a cross-language voice similarity analyzer, according to one implementation. As shown in FIG. 2, cross-language voice similarity analyzer 210 receives query audio sample 240 of a human voice and utilizes embedding model 252, vocal component decomposition module 254, embedding reconstruction module 256 and similarity comparison module 258, as well as database 230, to identify reference voice matches 242*a*, 242*b*, 242*c* and 242*d* (hereinafter "reference voice matches 242*a*-242*d*"). As further shown in FIG. 2, database 230 includes reference data 232 including reference audio, the talent speaking in the reference audio, and an audition identifier associated with the audio, to name a few examples. In addition database 230 includes vocal component vectors 234 each of which corresponds to both a respective human readable label (i.e., voice characteristic descriptor) and a respective vector representation of that voice characteristic descriptor.

It is noted that cross-language voice similarity analyzer 210, database 230, query audio sample 240 and reference voice matches 242*a*-242*d* correspond respectively in general to cross-language voice similarity analyzer 110, database 130, query audio sample 140 and reference voice match(es) 142, in FIG. 1. Consequently, cross-language voice similarity analyzer 110, database 130, query audio sample 140 and reference voice match(es) 142 may share any of the characteristics attributed to respective cross-language voice similarity analyzer 210, database 230, query audio sample 240 and reference voice matches 242*a*-242*d* by the present disclosure, and vice versa. That is to say, although not shown in FIG. 1, like cross-language voice similarity analyzer 210, cross-language voice similarity analyzer 110 may include features corresponding respectively to embedding model 252, vocal component decomposition module 254, embedding reconstruction module 256 and similarity comparison module 258. Moreover, although not shown in FIG. 2, like cross-language voice similarity analyzer 110, cross-language voice similarity analyzer 210 provides a GUI corresponding to GUI 120.

Embedding model 252 may be trained to evaluate the semantic similarity or difference between a query audio sample, such as query audio sample 240, and reference audio included in reference data 232, in a feature space. Moreover, in various implementations, one or more of embedding model 252, vocal component decomposition module 254 and embedding reconstruction module 256 may be implemented as a trained machine-learning (ML) model.

It is noted that, as defined in the present application, the expression "ML model" refers to a computational model for making predictions based on patterns learned from samples of data or training data. Various learning algorithms can be used to map correlations between input data and output data. These correlations from the computational model can be used to make future predictions on new input data. Such a predictive model may include one or more logistic regression models, Bayesian models, artificial neural networks (NNs) such as Transformers, large-language models, or multimodal foundation models, to name a few examples. In various implementations, ML models may be trained as classifiers and may be utilized to perform image processing, audio processing, natural-language processing, and other inferential analyses.

According to the exemplary implementation shown in FIG. 2, cross-language voice similarity analyzer 210 uses embedding model 252 to produce embedding vector representation 262 of the human voice included in query audio sample 240 in a multi-dimensional feature space that includes existing embedding vectors each corresponding respectively to a reference voice. Embedding vector representation 262 of the human voice included in query audio sample 240 is provided as an input to vocal component decomposition module 254, which reduces the dimensionality of embedding vector representation 262 of the human voice included in query audio sample 240 to identify linear or non-linear combination 264 of vocal component vectors 234 corresponding to that human voice, i.e., a linear combination 264 of vocal component vectors 234 corresponding to that human voice or a non-linear combination 264 of vocal component vectors 234 corresponding to that human voice. The linear or non-linear combination 264 of vocal component vectors 234 is then provided as an input to embedding reconstruction module 256, which increases the dimensionality of linear or non-linear combination 264 of vocal component vectors 234 to match the dimensionality of embedding vector representation 262 of the human voice included in query audio sample 240, to provide reconstructed embedding vector representation 266 of the human voice. Similarity comparison module 258 may then be used to identify most similar existing embedding vectors in the feature space of embedding model 252 as reference voice matches 242*a*-242*d*.

Thus, in various implementations, cross-language voice similarity analyzer 210 may include one or more of (i) a first ML model trained to generate embedding vector representation 262 of the human voice included in query audio sample 240 and serving as embedding model 252, (ii) a second ML model trained to decompose embedding vector representation 262 of the human voice included in query audio sample 240 to identify linear or non-linear combination 264 of vocal component vectors 234 corresponding to the human voice and serving as vocal component decomposition module 254, and (iii) a third ML model trained to increase the dimensionality of linear or non-linear combination 264 of vocal component vectors 234 to match the dimensionality of embedding vector representation 262 of the human voice to provide reconstructed embedding vector representation 266 of the human voice and serving as embedding reconstruction module 256.

With respect to the training and validation of the one or more ML models included in cross-language voice similarity analyzer 210, it is noted that those one or more ML models may be trained sequentially on each target language, i.e., a spoken language other than the source language in which the human voice included in query audio sample 240 speaks, sings, or speaks and sings. That is to say, the one or more ML models implemented as part of cross-language voice similarity analyzer 210 may initially be trained and validated only on a first target language. After those one or more ML models have been validated on that first target language, those one or more ML models may be trained and validated on a second target language, and so forth, until the one or more ML models have been trained and validated on all target languages to be learned by cross-language voice similarity analyzer 210.

It is noted that the functionality of cross-language voice similarity analyzer 110/210 in FIGS. 1 and 2 differs from conventional voice matching solutions in several important ways. Most conventional voice matching systems are concerned with the task of finding a specific individual for whom a reference voice sample exists, given a query voice sample from that same individual. For clarity, such conventional systems are referred to herein as Person Re-Identification (PReID) systems. The task performed by cross-language voice similarity analyzer 110/210 is distinct from and is in fact a more general formulation of traditional PReID tasks in the following ways.

First, in the cross-language voice similarity analysis performed by the systems and using the methods disclosed in the present application, the human speaker producing query audio sample 140/240 in the source language (corresponding to an original dialog or vocal performance) is generally not assumed to be present in reference data 232 for the target language. Second, according to the present cross-language voice similarity analysis solution, no assumptions are made that the utterances captured in query audio sample 140/240 and the reference voice samples are identical in content, pacing, or even semantics. Third, the present cross-language voice similarity analysis solution does not assume that the source and target languages are the same. By the nature of the voice characteristic descriptor decomposition, cross-language voice similarity analyzer 110/210 allows for voice similarity analysis based on voice characteristics as captured by application specific exemplars.

Referring to FIG. 1, another distinction between cross-language voice similarity analyzer 110 and conventional PReID is the degree of control that user 118 has while interacting with system 100 including cross-language voice similarity analyzer 110. Furthermore, although the voice-matching capabilities of system 100 may be deployed and executed in an automated process, as noted above, the intent is to expose the refinement capacity of cross-language voice similarity analyzer 110 to user 118, as described in greater detail below by reference to FIG. 4, and which represents another advantage over the present state-of-the-art.

FIG. 3 shows table 336 including an exemplary list of predetermined human readable voice characteristic descriptors 370 each corresponding respectively to a vocal component vector suitable for use in performing cross-language voice similarity analysis, as well as semantic description 372 of each voice characteristic descriptor 370, according to one implementation. It is noted each of voice characteristic descriptors 370 corresponds to a different one of vocal component vectors 234, in FIG. 2. It is further noted that table 336 represents one possible taxonomy of voice characteristic descriptors 370 for use in analyzing cross-language voice similarity. However, in various implementations it may be advantageous or desirable to use other taxonomies including fewer voice characteristic descriptors 370, more voice characteristic descriptors 370, or different voice characteristic descriptors 370.

Figure 4:
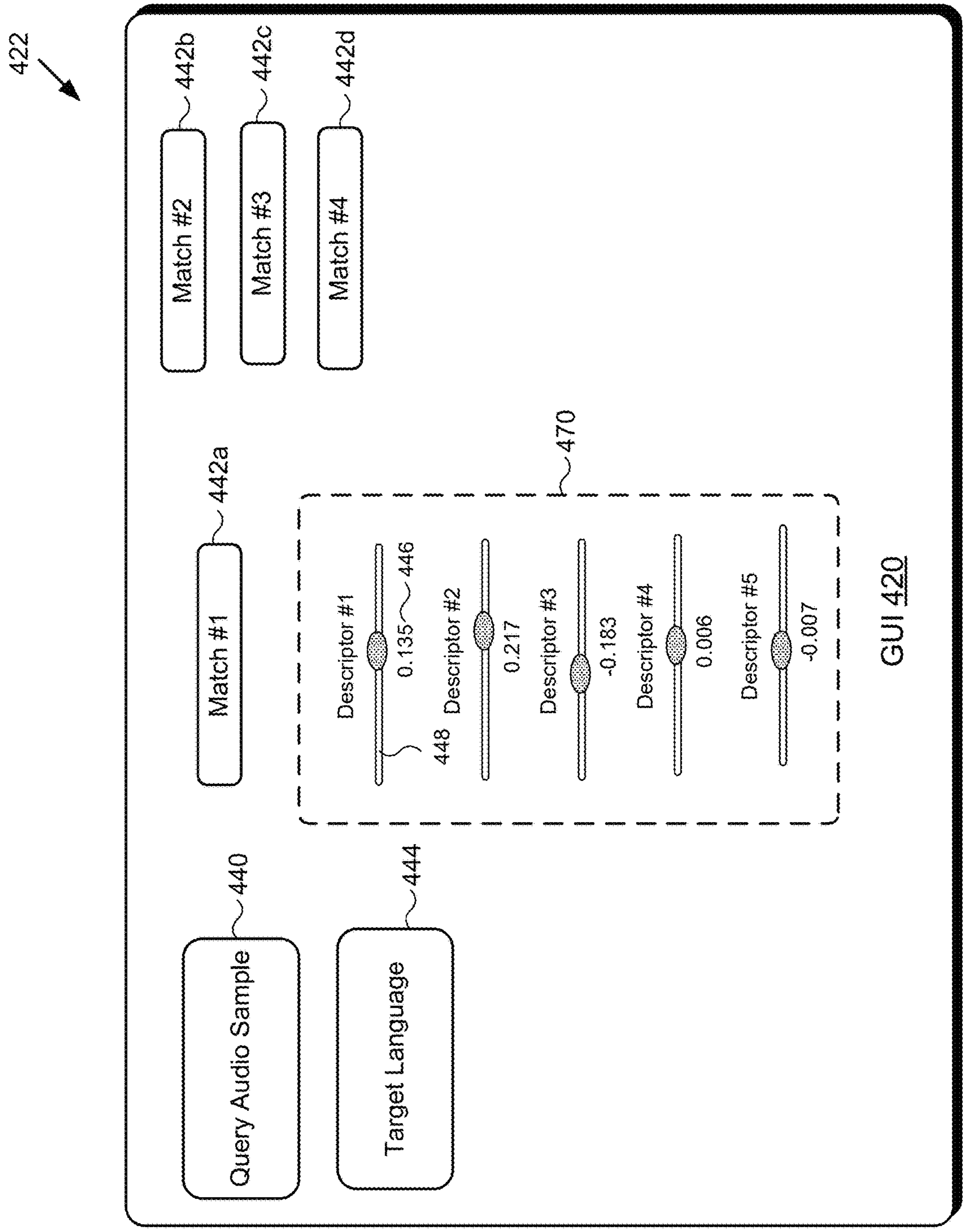
FIG. 4 shows an exemplary reference voice match refinement interface pane of a graphical user interface (GUI} provided by the cross-language voice similarity analyzer of FIGS. 1 and 2, according to one implementation.

Referring to FIG. 4 in combination with FIGS. 1 and 2, FIG. 4 shows exemplary reference voice match refinement interface pane 422 of GUI 420 provided by cross-language voice similarity analyzer 110/210, according to one implementation. As shown in FIG. 4, reference voice match refinement interface pane 422 of GUI 420 displays query audio sample 440 and enables a user to utilize target language selector 444 to identify a target language for reference voice matching. In response to user 118 requesting that a similar voice to the human voice included in query audio sample 440 be found, reference voice matches 442*a*, 442*b*, 442*c* and 442*d* (hereinafter "reference voice matches 442*a*-442*d*") may be displayed to user 118 for review and evaluation. Also displayed by reference voice match refinement interface pane 422 of GUI 420 are respective weighting factors, represented by exemplary reference number 446, for reference voice match 442*a* relative to each of predetermined voice characteristic descriptors 470. In addition, it is noted that any or all of voice characteristic descriptors 470 may be tuned or otherwise modified by adjusting its respective weighting factor 446 using an adjustable selector of each of voice characteristic descriptors 470, shown in FIG. 4 by exemplary reference number 448.

It is noted that GUI 420, query audio sample 440, reference voice matches 442*a*-442*d* and voice characteristic descriptors 470 correspond respectively in general to GUI 120, query audio sample 140/240, reference voice match(es) 142/242*a*-242*d* and voice characteristic descriptors 370, shown variously in FIGS. 1, 2 and 3. Consequently, GUI 120, query audio sample 140/240, reference voice match(es) 142/242*a*-242*d* and voice characteristic descriptors 370 may share any of the characteristics attributed to respective GUI 420, query audio sample 440, reference voice matches 442*a*-442*d* and voice characteristic descriptors 470 by the present disclosure, and vice versa.

Figure 5A:
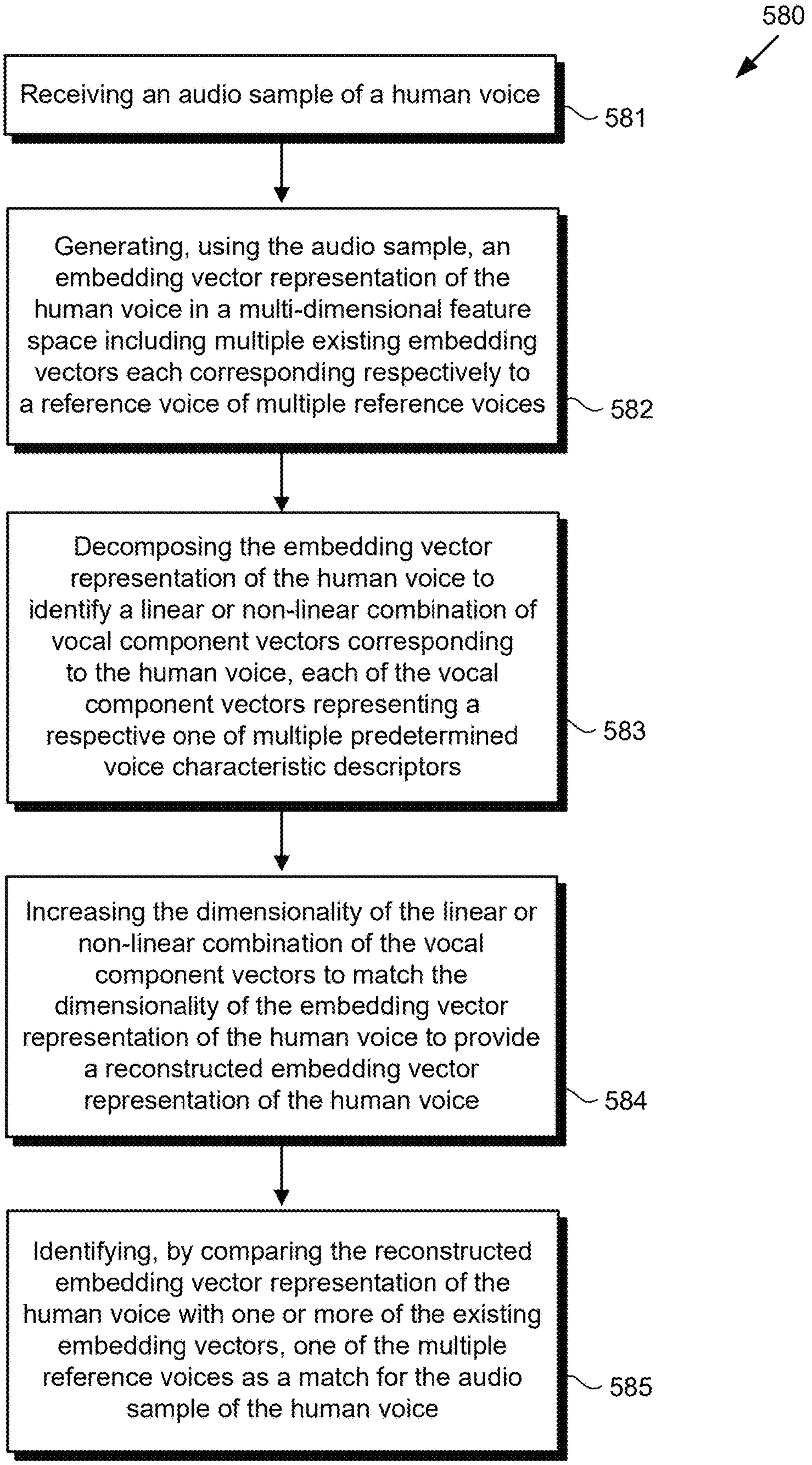
FIG. 5A is a flowchart outlining a method for performing cross-language voice similarity analysis, according to one implementation.
Figure 5B:
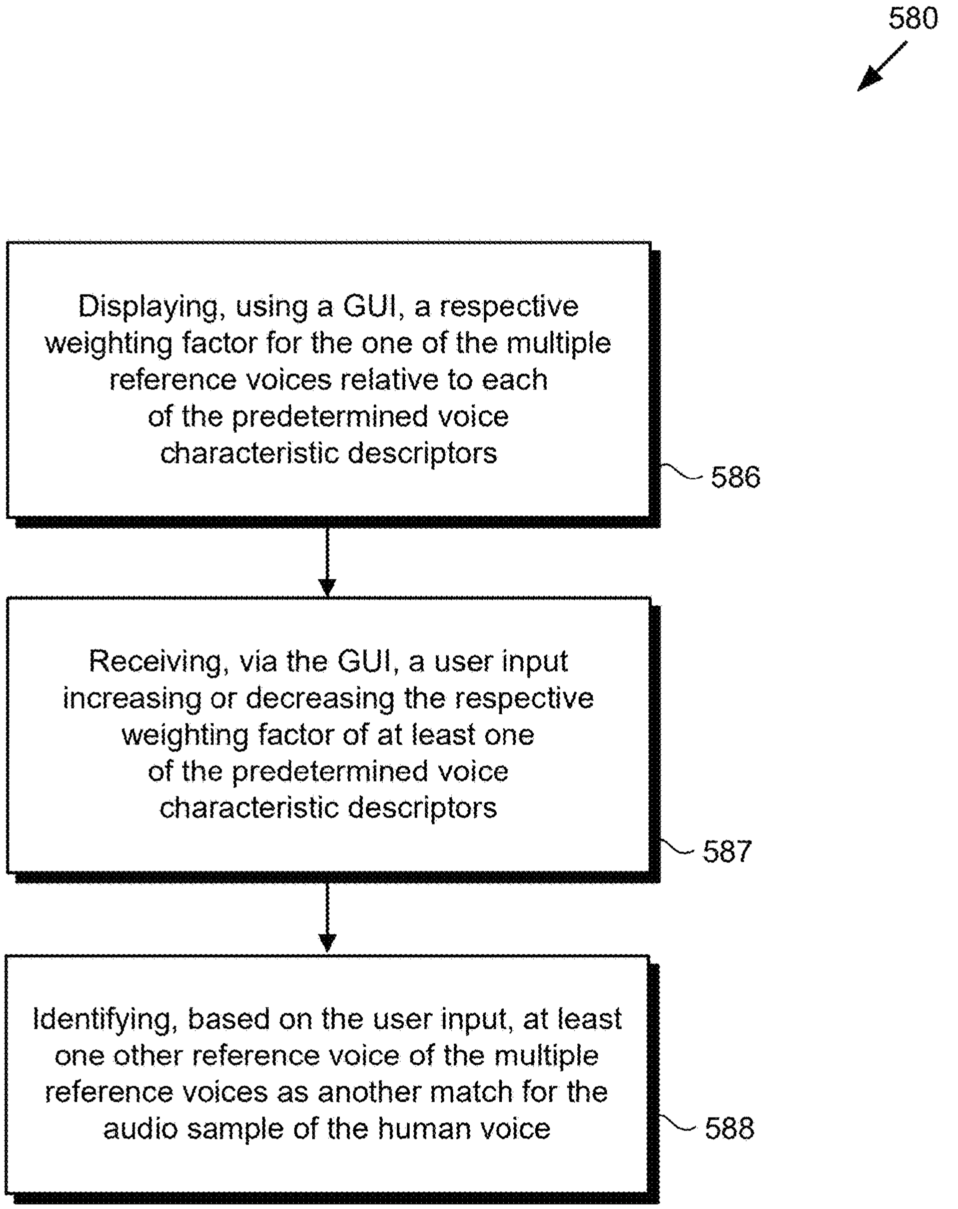
FIG. 5B shows exemplary additional actions for extending the method outlined in FIG. 5A, according to one implementation.

The functionality of system 100 and cross-language voice similarity analyzer 110/210 shown in FIGS. 1 and 2 will be further described by reference to FIGS. 5A and 5B. FIG. 5A shows flowchart 580 outlining an exemplary method for performing cross-language voice similarity analysis, according to one implementation, while FIG. 5B shows additional actions for extending the method outlined in FIG. 5A. With respect to the method outlined in FIGS. 5A and 5B, it is noted that certain details and features have been left out of flowchart 580 in order not to obscure the discussion of the inventive features in the present application.

Referring to FIG. 5A in combination with FIGS. 1 and 2, the method outlined by flowchart 580 includes receiving audio sample 140/240 of a human voice (action 581). It is noted that, in various use cases, audio sample 140/240 of the human voice may include one or both of speech by the human voice and singing by the human voice.

Action 581 may be performed by cross-language voice similarity analyzer 110/210, executed by hardware processor 104 of system 100. For example, and as shown in FIG. 1, in some implementations audio sample 140 may be received by system 100 from user system 116 via communication network 112 and network communication links 114.

Continuing to refer to FIGS. 1, 2 and 5A in combination, the method outlined by flowchart 580 further includes generating, using audio sample 140/240, embedding vector representation 262 of the human voice included in query audio sample 140/240, in a multi-dimensional feature space including multiple existing embedding vectors each corresponding respectively to a reference voice of multiple reference voices (action 582). As noted above by reference to FIG. 2, the generation of embedding vector representation 262 of the human voice included in query audio sample 140/240, in action 582, may be performed by cross-language voice similarity analyzer 110/210, executed by hardware processor 104 of system 100, using embedding model 252 in the form of a trained ML model.

Referring to FIGS. 1, 2, 3 and 5A in combination, the method outlined by flowchart 580 further includes decomposing embedding vector representation 262 of the human voice included in query audio sample 140/240 to identify linear or non-linear combination 264 of vocal component vectors 234 corresponding to the human voice, each of vocal component vectors 234 representing a respective one of multiple predetermined voice characteristic descriptors 370 (action 583). In some implementations, decomposing embedding vector representation 262 of the human voice to identify linear or non-linear combination 264 of vocal component vectors 234 may be performed using linear regression. The decomposition of embedding vector representation 262 to identify linear or non-linear combination 264 of vocal component vectors 234, in action 583, may be performed by cross-language voice similarity analyzer 110/210, executed by hardware processor 104 of system 100, using vocal component decomposition module 254, which, in some implementations may take the form of a trained ML model, as noted above.

Referring to FIGS. 1, 2 and 5A in combination, the method outlined by flowchart 580 further includes increasing the dimensionality of linear or non-linear combination 264 of vocal component vectors 234 to match the dimensionality of embedding vector representation 262 of the human voice included in query audio sample 140/240 to provide reconstructed embedding vector representation 266 of the human voice (action 584). In some implementations, increasing the dimensionality of linear or non-linear combination 264 of vocal component vectors 234 to match the dimensionality of embedding vector representation 262 may be performed using matrix multiplication. Action 584 may be performed by cross-language voice similarity analyzer 110/210, executed by hardware processor 104 of system 100, using vocal embedding reconstruction module 256, which, in some implementations may take the form of a trained ML model, as also noted above.

Referring to FIGS. 1, 2, 4 and 5A in combination, the method outlined by flowchart 580 further includes identifying, by comparing reconstructed embedding vector representation 266 of the human voice included in query audio sample 140/240/440 with one or more of the multiple existing embedding vectors included in the multi-dimensional feature space, one of the multiple reference voices as a match (e.g., reference voice match 142/242*a*/442*a*) for query audio sample 140/240/440 of the human voice (action 585). In some implementations, comparing reconstructed embedding vector representation 266 of the human voice with the one or more of the multiple existing embedding vectors, in action 585, may be performed based on cosine similarity.

It is noted that query audio sample 140/240/440 of the human voice may include either one or both of speech and singing in a first language, while the reference voice match identified in action 585 may be one or both of speech and singing in a second language different than the first language. Identification of the reference voice match in action 585 may be performed by cross-language voice similarity analyzer 110/210, executed by hardware processor 104 of system 100, using similarity comparison module 258.

In some implementations, the method outlined by flowchart 580 may conclude with action 585 described above. However, in other implementations the method outlined by flowchart 580 may be extended to include action 586, or actions 586, 587 and 588 described in FIG. 5B. Referring to FIG. 5B with further reference to FIGS. 1 and 4, in some implementations the method outlined by flowchart 580 may further include displaying, using GUI 120/420, a respective weighting factor 446 for the reference voice match (e.g., reference voice match 142/442*a*) relative to each of multiple predetermined voice characteristic descriptors 470 (action 586). Action 586 may be performed by cross-language voice similarity analyzer 110/210, executed by hardware processor 104 of system 100, using reference voice match refinement interface pane 422 of GUI 420.

Continuing to refer to FIGS. 1, 4 and 5B in combination, in implementations in which the method outlined by flowchart 580 includes action 586, flowchart 580 may further include receiving, via GUI 120/420, a user input increasing or decreasing the respective weighting 446 factor of at least one of predetermined voice characteristic descriptors 470 (action 587). By way of example, user 118 may utilize adjustable selector 448 of reference voice match refinement interface pane 422 for any of voice characteristic descriptors 470 to increase or decrease its respective weighting factor. The user input increasing or decreasing the respective weighting factor 446 of at least one of predetermined voice characteristic descriptors 470 may be received, in action 587, by cross-language voice similarity analyzer 110/210, executed by hardware processor 104 of system 100, using reference voice match refinement interface pane 422 of GUI 420.

Continuing to refer to FIGS. 1, 4 and 5B in combination, in implementations in which the method outlined by flowchart 580 includes actions 586 and 587, flowchart 580 may further include identifying, based on the user input received in action 587, at least one other reference voice of the multiple reference voices as another match (e.g., reference voice match 142/442*b*) for query audio sample 140/440 of the human voice (action 588). In some implementations, identification of the at least one other reference voice match 142/442*b* as another match for query audio sample 140/440 of the human voice based on the user input received in action 587, may be performed in action 588 based on cosine similarity.

As noted above, audio sample 140/240/440 of the human voice may include either one or both of speech and singing in a first language, while the at least one other reference voice match identified in action 588 may be one or both of speech and singing in a second language different than the first language. Identification of the at least one other reference voice match in action 588, based on the user input received in action 587, may be performed by cross-language voice similarity analyzer 110/210, executed by hardware processor 104 of system 100, using similarity comparison module 258.

With respect to the method outlined by flowchart 580 and described above, it is noted that actions 581, 582, 583, 584 and 585 (hereinafter "actions 581-585), or actions 581-585 and 586, or actions 581-585, 586, 587 and 588, may be performed in an automated process from which human participation may be omitted.

With respect to the cross-language voice similarity analysis solution disclosed herein, it is noted that although that solution has been described as being particularly advantageous when applied to localization of source content in a source language into a different (target) language, the solution may also be advantageously applied to other use cases. Examples of such other use cases include selecting scratch audio for storyboarding and first drafts, making casting decisions based on voice comparisons, optimizing selection of animated characters most suitable for use in animated productions, voice synthesis, and post-production audio mixing to enhance voice sound quality, to name a few.

Thus, the present application discloses systems and methods for performing cross-language voice similarity analysis that advance the state-of-the-art and streamlines the process of voice casting by efficiently computing voice similarity to find well-matched voices across different spoken languages. The present cross-language voice similarity analysis solution advantageously preserves interpretability and creative control for voice casting personnel, while substantially reducing or eliminating the influence of human bias, making the work of voice casting faster, fairer, and more thorough. Moreover, the present cross-language voice similarity analysis solution can advantageously be applied to sung, as well as spoken, language.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
- a computing platform including a hardware processor; and
- a memory storing a cross-language voice similarity analyzer;
- the hardware processor configured to execute the cross-language voice similarity analyzer to:
  - generate, using an audio sample of a human voice, an embedding vector representation of the human voice in a multi-dimensional feature space including a plurality of existing embedding vectors each corresponding respectively to a reference voice of a plurality of reference voices;
  - decompose the embedding vector representation of the human voice, by reducing a dimensionality of the embedding vector representation of the human voice, to identify a linear combination of predetermined vocal component vectors corresponding to the human voice or a non-linear combination of predetermined vocal component vectors corresponding to the human voice, each of the predetermined vocal component vectors representing a respective one of a plurality of predetermined voice characteristic descriptors;
  - increase a dimensionality of the linear combination of the predetermined vocal component vectors or the non-linear combination of the predetermined vocal component vectors to match a dimensionality of the embedding vector representation of the human voice to provide a reconstructed embedding vector representation of the human voice; and
  - identify, by comparing the reconstructed embedding vector representation of the human voice with one or more of the plurality of existing embedding vectors, one of the plurality of reference voices as a match for the audio sample of the human voice.

2. The system of claim 1, wherein the match is identified in an automated process.

3. The system of claim 1, further comprising:
- a graphical user interface (GUI) provided by the cross-language voice similarity analyzer;
- wherein the hardware processor is further configured to execute the cross-language voice similarity analyzer to:
- display, using the GUI, a respective weighting factor for the one of the plurality of reference voices relative to each of the plurality of predetermined voice characteristic descriptors.

4. The system of claim 3, wherein the hardware processor is further configured to execute the cross-language voice similarity analyzer to:
- receive, via the GUI, a user input increasing or decreasing the respective weighting factor of at least one of the plurality of predetermined voice characteristic descriptors;
- identify, based on the user input, at least one other reference voice of the plurality of reference voices as another match for the audio sample of the human voice.

5. The system of claim 1, wherein the audio sample is in a first language and wherein the one of the plurality of reference voices is in a second language different than the first language.

6. The system of claim 1, wherein the audio sample comprises singing by the human voice.

7. The system of claim 1, wherein the cross-language voice similarity analyzer comprises at least one of: (i) a first machine learning (ML) model trained to generate the embedding vector representation of the human voice in the multi-dimensional feature space, (ii) a second ML model trained to decompose the embedding vector representation of the human voice to identify the linear combination of the predetermined vocal component vectors corresponding to the human voice or the non-linear combination of the predetermined vocal component vectors corresponding to the human voice, or (iii) a third ML model trained to increase the dimensionality of the linear combination of the predetermined vocal component vectors or the non-linear combination of the predetermined vocal component vectors to match the dimensionality of the embedding vector representation of the human voice to provide the reconstructed embedding vector representation of the human voice.

8. The system of claim 1, wherein decomposing the embedding vector representation of the human voice to identify the linear combination of the predetermined vocal component vectors corresponding to the human voice or the non-linear combination of the predetermined vocal component vectors corresponding to the human voice is performed using linear regression.

9. The system of claim 1, wherein increasing the dimensionality of the linear combination of the predetermined vocal component vectors or the non-linear combination of the predetermined vocal component vectors to match the dimensionality of the embedding vector representation of the human voice is performed using matrix multiplication.

10. The system of claim 1, wherein comparing the reconstructed embedding vector representation of the human voice with the one or more of the plurality of existing embedding vectors is performed based on cosine similarity.

11. A method for use by a system including a hardware processor and a memory storing a cross-language voice similarity analyzer, the method comprising:

generating, by the cross-language voice similarity analyzer executed by the hardware processor and using an audio sample of a human voice, an embedding vector representation of the human voice in a multi-dimensional feature space including a plurality of existing embedding vectors each corresponding respectively to a reference voice of a plurality of reference voices;

decomposing, by the cross-language voice similarity analyzer executed by the hardware processor, the embedding vector representation of the human voice, by reducing a dimensionality of the embedding vector representation of the human voice, to identify a linear combination of predetermined vocal component vectors corresponding to the human voice or a non-linear combination of predetermined vocal component vectors corresponding to the human voice, each of the predetermined vocal component vectors representing a respective one of a plurality of predetermined voice characteristic descriptors;

increasing, by the cross-language voice similarity analyzer executed by the hardware processor, a dimensionality of the linear combination of the predetermined vocal component vectors or the non-linear combination of the predetermined vocal component vectors to match a dimensionality of the embedding vector representation of the human voice to provide a reconstructed embedding vector representation of the human voice; and identifying, by the cross-language voice similarity analyzer executed by the hardware processor through comparison of the reconstructed embedding vector representation of the human voice with one or more of the plurality of existing embedding vectors, one of the plurality of reference voices as a match for the audio sample of the human voice.

12. The method of claim 11, wherein the match is identified in an automated process.

13. The method of claim 11, further comprising a graphical user interface (GUI) provided by the cross-language voice similarity analyzer, the method further comprising:

displaying, by the cross-language voice similarity analyzer executed by the hardware processor and using the GUI, a respective weighting factor for the one of the plurality of reference voices relative to each of the plurality of predetermined voice characteristic descriptors.

14. The method of claim 13, further comprising:

receiving via the GUI, by the cross-language voice similarity analyzer executed by the hardware processor, a user input increasing or decreasing the respective weighting factor of at least one of the plurality of predetermined voice characteristic descriptors;

identifying, by the cross-language voice similarity analyzer executed by the hardware processor based on the user input, at least one other reference voice of the plurality of reference voices as another match for the audio sample of the human voice.

15. The method of claim 11, wherein the audio sample is in a first language and wherein the one of the plurality of reference voices is in a second language different than the first language.

16. The method of claim 11, wherein the audio sample comprises singing by the human voice.

17. The method of claim 11, wherein the cross-language voice similarity analyzer comprises at least one of: (i) a first machine learning (ML) model trained to generate the embedding vector representation of the human voice in the multi-dimensional feature space, (ii) a second ML model trained to decompose the embedding vector representation of the human voice to identify the linear combination of the predetermined vocal component vectors corresponding to the human voice or the non-linear combination of the predetermined vocal component vectors corresponding to the human voice, or (iii) a third ML model trained to increase the dimensionality of the linear combination of the predetermined vocal component vectors or the non-linear combination of the predetermined vocal component vectors to match the dimensionality of the embedding vector representation of the human voice to provide the reconstructed embedding vector representation of the human voice.

18. The method of claim 11, wherein decomposing the embedding vector representation of the human voice to identify the linear combination of the predetermined vocal component vectors corresponding to the human voice or the non-linear combination of the predetermined vocal component vectors corresponding to the human voice is performed using linear regression.

19. The method of claim 11, wherein increasing the dimensionality of the linear combination of the predetermined vocal component vectors or the non-linear combination of the predetermined vocal component vectors to match the dimensionality of the embedding vector representation of the human voice is performed using matrix multiplication.

20. The method of claim 11, wherein comparing the reconstructed embedding vector representation of the human voice with the one or more of the plurality of existing embedding vectors is performed based on cosine similarity.

* * * * *